US005790957A

United States Patent [19]

Heidari

[11] Patent Number: 5,790,957
[45] Date of Patent: Aug. 4, 1998

[54] SPEECH RECALL IN CELLULAR TELEPHONE

[75] Inventor: Alireza Ryan Heidari, Encinitias, Calif.

[73] Assignee: Nokia Mobile Phones Ltd., Salo, Finland

[21] Appl. No.: 527,368

[22] Filed: Sep. 12, 1995

[51] Int. Cl.$^6$ .................................................. H04Q 7/32
[52] U.S. Cl. ........................ 455/553; 455/412; 455/572
[58] Field of Search ................................ 379/56, 58, 59, 379/67, 88, 89; 455/403, 413, 551, 450, 448, 455, 464, 412, 433, 435, 422, 54.1, 89, 90

[56] References Cited

U.S. PATENT DOCUMENTS

| 5,003,576 | 3/1991 | Helferich | 455/422 |
|---|---|---|---|
| 5,109,525 | 4/1992 | Nichols | 455/89 |
| 5,327,481 | 7/1994 | Horimoto | 379/58 |
| 5,333,176 | 7/1994 | Burke et al. | 379/58 |
| 5,455,579 | 10/1995 | Bennett et al. | 455/412 |
| 5,499,286 | 3/1996 | Kobayashi | 379/58 |
| 5,551,073 | 8/1996 | Sammarco | 455/422 |
| 5,630,205 | 5/1997 | Ekelund | 455/54.1 |

Primary Examiner—Edward F. Urban
Assistant Examiner—Keith Ferguson
Attorney, Agent, or Firm—Perman & Green, LLP

[57] ABSTRACT

A cellular telephone having transmit and receive channels with a digital-mode communication capability includes also a memory and switching circuitry operative under control of a microcontroller. The switching circuitry enables connection of input and output ports of the memory to either one of the channels. By entry of commands to the microcontroller, the microcontroller arranges the configuration of the switching circuitry to permit storage in the memory of a message originating locally from a user of the telephone, inputted via a microphone connected to the transmit channel, or from a distant telephone connected via a communication link to the receiving channel. Subsequent playback of the message from the memory may be coupled via the switching circuitry to a speaker of the telephone to be heard by a user of the telephone, or may be outputted to the transmit channel for communication to the distant telephone. Preferably, the message is stored in compressed format to save memory space. This enables the telephone to provide features of prompt, voice pad, transcription, and voice mail. In addition, a reduction on a data sampling rate, in response to the condition of a battery charge, permits an extended period of operation of the telephone prior to the termination of adequate battery voltage.

19 Claims, 1 Drawing Sheet

FIG. 1

SPEECH RECALL IN CELLULAR TELEPHONE

BACKGROUND OF THE INVENTION

This invention relates to speech communication by a cellular telephone operable in both a digital mode and in an analog mode of communication and, more particularly, to the inclusion of a memory for storing voice signals in a compressed format for subsequent recall, thereby allowing a stored message to be heard by a person utilizing the telephone or by a distant party communicating via a central base station.

Cellular telephones may be constructed with a dual-mode operational capability wherein, in one mode, voice signals are communicated via an analog signal protocol and, in the second mode, the voice signals are communicated via digital signal compression. Some base stations operate in an analog mode while other base stations are able to operate in the digital mode. The dual-mode telephone is able to take advantage of the digital signal protocol when offered by a base station, while falling back to the analog signal protocol for base stations offering only the analog mode of communication. For vehicles traveling from the region of one base station to the region of a second base station, there is a hand-off procedure wherein the cellular telephone automatically tunes to a new assigned communications channel and, in addition, may undergo a switching between the digital and the analog modes of communication.

It is recognized that dual-mode telephones have circuitry for both compression and expansion of speech, this circuitry being employed in a vocoder for more efficient communication of speech between the telephone and a distant telephone of the cellular telephone system. Compression and expansion circuitry are employed generally in electronics for enabling various types of communication functions, in addition to the foregoing vocoder functions.

Presently available cellular telephones suffer from the disadvantage of being unable to provide additional functions associated with the use of telephones, such as a voice mail (answer machine) function and possibly other functions entailing the storage of speech or message for later recall or playback. This appears to be a failure to fully utilize existing circuitry of the digital vocoder to accomplish other useful functions without requiring a major redesign of the telephone or significant increase of electronic components within the telephone.

SUMMARY OF THE INVENTION

The aforementioned disadvantage is overcome and other benefits are provided by a cellular telephone which operates in accordance with the invention by providing a memory to operate in concert with the digital vocoder of the telephone. The addition of a speech memory to a dual mode telephone which is already provided with voice compression and expansion circuitry in the telephone's digital vocoder presents the opportunity for accomplishing various convenience features which depend on the storage of a spoken message for subsequent recall.

One such feature which is provided by the invention may be referred to as a voice pad wherein the telephone acts as a recording machine. With this feature, upon the pushing of a key on a control panel on the telephone, all of the received (incoming) speech and/or the transmitted (outgoing) speech is recorded while the person utilizing the telephone is able to maintain a conversation. The recording of the message terminates upon the pushing of a key on the control panel. The playing back of the recorded message is accomplished at a later time, simply by pushing a key on the control panel.

A further feature may be referred to as a prompt on command wherein an instructional message is recorded for subsequent playback upon the occurrence of an incoming call. By way of example in the utilization of this feature, an attendee at a meeting might instruct an incoming caller to hold on for a sufficient time to allow the attendee to exit the meeting to answer the telephone. The storing of the instructional message is similar to the generation of an outgoing message on an answer machine.

As yet a further feature, the telephone may serve as a transcriber for receiving dictation to be played back at a later time convenient for transcription. At the later time, a telephone communication is established with a distant telephone, presumably at the location of a secretary, and the dictation is outputted from the memory and transmitted to the distant telephone.

As yet another feature, the telephone may be operated as an answer machine wherein, an incoming message is recorded in the memory and, wherein, upon the pushing of a button on the control panel, the stored message is played back to a person utilizing the telephone.

A further feature is operable independently of the operation of the foregoing features utilizing the memory, this feature providing for a variable sampling rate in the speech codec. By reducing the sampling rate, the number of transitions in the signal or logic states of the digital circuitry of the vocoder are reduced, this resulting in a reduction in power drain from the telephone battery. Accordingly, when the battery is nearing the end of its charge, additional conversation can be carried on for a limited period of time, but with reduced fidelity due to the lower sampling rate. Reduction of the sampling rate may be employed also to conserve available space in the memory for the storage of a message, this feature being implemented automatically by use of a memory watchdog circuit.

Typically, in the construction of a cellular telephone, the voice signal is received by a microphone, and is applied to pulse code modulation (PCM) circuitry. The PCM circuitry includes a codec which obtains analog samples of the voice signals, and converts the samples from analog format to digital format. For transmission via the digital communication mode, the telephone is provided with a vocoder which includes both digital compression and digital expansion circuitry. The compression circuitry is employed for transmission of an outgoing signal and provides a compressed packet of the voice signal having a reduced number of samples. The expansion circuitry is employed during reception of an incoming signal and operates to restore the voice signal to the same form which the voice signal had prior to the compression. For transmission via the digital mode of communication, the signal outputted by the codec is applied via the compression circuitry to obtain a digitally formatted compressed signal. The compressed signal is then encoded in accordance with a digital mode of communication, for example, time division multiple access (TDMA) or code division multiple access (CDMA), and then is modulated onto a carrier for transmission to the base station. The signal received from the base station is demodulated, decoded, and decompressed to regain the analog sampled data format of the voice signal. This places the received signal in the PCM format ready to be applied to a speaker of the radiotelephone by which a person hears the received voice.

In the case of communication via the analog communication mode, the foregoing compression/expansion circuitry and TDMA/CDMA modulation and demodulation circuitry is bypassed by analog protocol transmission and reception circuitry. The received signal is in the PCM format ready to be applied to the speaker by which the person hears the received voice signal. It is noted that the operation of a radiotelephone entails also the use of numerous control signals operative within a control channel of the radiotelephone for accomplishing tasks such as assignment of communication channels to a base station and implementation of hand-off procedures. A description of such control signals is not necessary for an understanding of this invention and, accordingly, no description of the control signals and of their specialized electric circuits is provided herein.

The foregoing features of the invention can be accomplished with an analog telephone, a digital telephone, or a dual-mode telephone operable in either the analog or the digital mode. In the practice of the invention, it is recognized that a significant savings of storage space in the memory can be accomplished by the storing of speech signals in a compressed format. The compression of the speech signals is attained by use of compression circuitry within the vocoder of a digital telephone or within the vocoder of a dual-mode telephone. Accordingly, the preferred embodiment of the invention is demonstrated for a dual-mode telephone wherein the digital compression circuitry of the vocoder is utilized to compress a voice signal prior to its storage in the memory unless the incoming voice signal has already been compressed by a distant digital telephone. Voice signals outputted by the memory are applied to the expansion circuitry of the vocoder in order to be heard by a person utilizing the telephone, unless the voice signal is to be transmitted to a distant telephone in which case the voice signal would be expanded at the distant telephone to be heard by a user of the distant telephone.

The various functions can be accomplished with the aid of switching circuitry which switches an input port of the memory to a receive channel or a transmit channel or to both of the channels of the telephone in accordance with the source of the speech which is to be recorded. The switching circuitry is also operative to connect an output port of the memory to either the transmit channel, or the receive channel of the telephone in accordance with the location of the intended recipient of the outputted recorded message. In addition, switching circuitry provides for a conversion of a received analog mode signal to a digital mode by interrupting the receive channel, and rerouting the received analog signal via the compression circuitry of the vocoder to the memory. The rerouting continues from the memory through the digital expansion circuitry of the vocoder to the output speaker of the telephone. By such a rerouting of the received signal, the person listening to the incoming speech is able to hear the speech with perfect clarity while, due to the compression of the speech, the memory is able to store the speech in the compressed digital format. For operation of the radiotelephone in an all-digital mode of operation, no such rerouting of the received signal is required, and the received signal as well as the transmitted signal can be applied directly to the memory for storage therein. Operation of the various switches is under control of a microcontroller unit of the telephone whereby automatic operation of the switches is accomplished in response to commands entered into the keyboard of the control panel.

BRIEF DESCRIPTION OF THE DRAWING

The aforementioned aspects and other features of the invention are explained in the following description, taken in connection with the accompanying drawing wherein the sole figure is a block diagram showing the audio portion of a mobile telephone incorporating the invention, a set of switches of a digital signal processor of the telephone for routing a voice signal through a vocoder, and a memory for storage and recall of a message.

DETAILED DESCRIPTION

Figure 1:
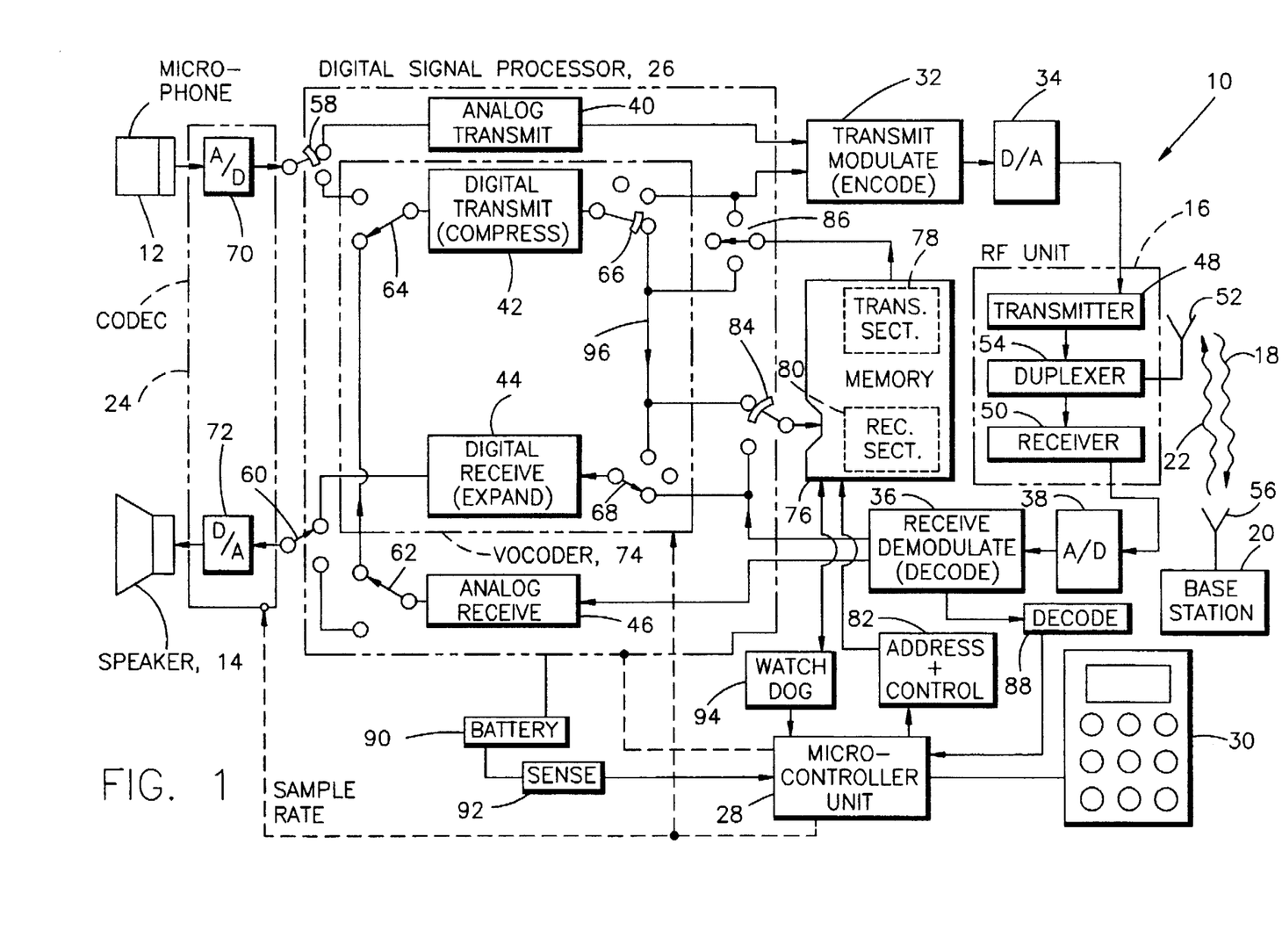

With reference to FIG. 1, a radiotelephone or mobile telephone 10 is provided with a microphone 12 by which the telephone 10 picks up the voice of a person utilizing the telephone 10, and a speaker 14 by which a voice signal received by the telephone 10 is presented to the person utilizing the telephone 10. The voice signal, after being suitably encoded and modulated onto a carrier, as will be described hereinafter, is transmitted by an RF (radio frequency) unit 16 of the telephone 10 by a down-link transmission path 18 to a base station 20. In corresponding fashion, a voice signal to be received by the telephone 10 is transmitted from the base station 20 along an up-link transmission path 22 to the RF unit 16. The telephone 10 is part of a telephone system including a multitude of telephones (not shown) which communicate with each other via the base station 20 in designated frequency bands, and by analog or digital modes of communication which are well known. By way of example, well-known modes of digital communication include the aforementioned TDMA and CDMA. The telephone 10 is constructed as a dual-mode telephone capable of communicating alternatively in either an analog or a digital mode of communication.

The telephone 10 further comprises a codec 24, a digital signal processor (DSP) 26 under control of a microcontroller unit (MCU) 28, a control panel 30 also controlled by the MCU 28, a transmit modulator 32 coupled by a digital-to-analog converter 34 to the RF unit 16, and a receive demodulator 36 coupled via an analog-to-digital converter 38 to the RF unit 16. The control panel 30 may be constructed in a well-known form having pushbuttons and a display utilized by a person operating the telephone 10 to place a call. The DSP 26 includes an analog transmitter 40, a digital transmitter 42, a digital receiver 44, and an analog receiver 46. The RF unit 16 comprises a transmitter 48, a receiver 50, an antenna 52, and a duplexer 54 which interconnects the transmitter 48 and the receiver 50 with the antenna 52. The base station 20 includes an antenna 56 for electromagnetic communication via the paths 18 and 22 with the antenna 52 of the RF unit 16. Also included in the DSP 26 is a pair of switches 58 and 60 to enable selection of the analog or digital mode of communication. Four additional switches 62, 64, 66, and 68 are provided in the DSP 26 and are operative in conjunction with the switches 58 and 60 for reconfiguring the interconnection of the components of the DSP 26 to introduce a digitally formatted signal into an analog branch of a receiving channel (to be described hereinafter), thereby to enable generation of a digitally compressed signal for subsequent storage in the practice of the various features of the invention as will be described hereinafter.

The analog transmitter 40 and the digital transmitter 42 represent parallel branches of the transmit channel, and the analog receiver 46 and the digital receiver 44 represent parallel branches of the receive channel of the telephone 10. Either the analog branches or the digital branches are employed depending, respectively, on whether an analog or digital mode of communication is to be employed. Furthermore, the digital transmitter 42 and the digital receiver 44 may be connected in a back-to-back configuration when it is desired to introduce the digital speech compression into a received analog mode signal for storage. Such back-to-back configuration can be accomplished by a switching of existing circuitry of the DSP 26 without need for additional circuitry.

In operation, during both analog and digital modes of communication, the codec 24 provides for a sampling of the audio signal received by the microphone 12, the sampling being accomplished at a rate of typically 8,000 Hertz (Hz) by use of pulse code modulation (PCM) wherein the amplitude of each signal sample is held until the occurrence of the next sample. The amplitudes of the successive samples are converted from analog to digital format by an analog-to-digital converter 70 of the codec 24. The output signal of the converter 70 is a digital bit stream representing the samples of the speech waveform. By way of example, for a linear codec having 13bit resolution, the output of the converter 70 provides 13bits per sample wherein the samples are outputted at a rate of 8,000 samples per second. This gives a bit rate of 104K bits per second. In the event that the codec 24 operates in a nonlinear, such as a Mu-law, fashion having an 8 bit resolution per sample, and the samples are outputted at a rate of 8,000 samples per second, the output of the converter 70 is at 64K bits per second. Also included in the codec 24 is a digital-to-analog converter 72 which provides a conversion process which is reverse to that of the converter 70. The converter 72 converts a digital bit stream outputted via the switch 60 of the DSP 26 to a succession of analog signal samples which drive the speaker 14. In the analog communication mode, wherein there is no digital signal compression, the speech quality outputted by the speaker 14 may be referred to as PCM speech quality.

In the analog communication mode, the digital bit stream outputted by the converter 70 is coupled via the switch 58 to the analog transmitter 40 wherein the speech samples are interpolated to increase the sampling rate from the foregoing rate of 8,000 samples per second to a rate of 160K samples per second. This preserves the 13 bit resolution of a sample. The signal outputted by the analog transmitter 40 is applied to the transmit modulator 32 which acts, in the analog communication mode, to provide for a frequency modulation of the output signal of the analog transmitter 40. This modulation is accomplished digitally, and a digital output signal of the modulator 32 is then converted by the converter 34 to analog format and applied to an input terminal of the transmitter 48. The transmitter 48 includes circuitry (not shown) for modulating the output signal of the converter 34 on to the down-link RF carrier for transmission to the base station 20.

The voice signal transmitted from a distant telephone via the base station 20 is communicated by an up-link carrier frequency and via the duplexer 54 to the receiver 50. The duplexer 54 serves to separate the transmitted carrier signal of the transmitter 48 from the received carrier signal at the receiver 50. The receiver 50 translates the received voice signal from the carrier frequency to an intermediate frequency (IF). The IF signal is converted from analog to digital format by the converter 38 and applied to the receiver demodulator 36. The receive demodulator 36 demodulates the FM signal, and outputs the demodulated signal to the analog receiver 46 of the DSP 26. In the analog receiver 46, the speech sampling rate is reduced from 40K samples per second, via a down-sampling procedure, to the 8,000 samples per second rate, and is then sent via the switch 62 and the switch 60 to the converter 72 of the codec 24. The converter 72 converts the digitally formatted signal to the analog format, as has been noted above, for driving the speaker 14.

In the digital communication mode, use is made of the digital transmitter 42 and the digital receiver 44 which constitute a vocoder 74, the vocoder 74 being a part of the DSP 26 and operating under control of the microcontroller unit 28. The vocoder 74 operates in a well-known fashion to introduce a compression to the speech for voice signals to be transmitted by the RF unit 16, and to decompress, or expand, voice signals received by the RF unit 16. The vocoder 74 may be operative to provide for signal compression and decompression in accordance with the well-known CDMA or TDMA protocols. A speech compression protocol may be used for cellular telephony in big cities having a relatively large amount of telephone traffic, as compared to rural areas. The speech compression enables many more telephone conversations to be conducted concurrently among a multitude of telephones than is possible with the analog mode of communication. The speech compression employs the digital communication mode. Operation of the switch 58 in conjunction with the switches 64 and 66 selects which branch of the transmit channel is to handle the outgoing voice signal of the microphone 12. Operation of the switch 60 selects the branch of the receive channel which is to handle the received signal for driving the speaker 14.

By way of example, in the case of a vehicle transporting the telephone 10 from a large city to a rural area, the switches 58 and 60, would be initially in a position for conduction of the voice signal via the digital transmitter 42 and via the digital receiver 44 in the digital communication mode. Thereafter, upon passage of the vehicle from the city into the rural area, the switch 58 would be operated to switch the outgoing voice signal via the analog transmitter 40, thereby to bypass the digital transmitter 42. Also, if desired, the switches 60 and 62 may be operated to direct the received signal via the analog branch of the transmit channel, thereby to bypass the digital receiver 44.

In the operation of the telephone 10 in the digital communication mode, the signal from the converter 70 is coupled via the switch 58 and the switch 64 to the digital transmitter 42. The digital transmitter 42 compresses the samples of the voice signal from a sampling rate of 104K bits per second, or possibly from a rate of 64K bits per second depending on the type of equipment used, to a maximum rate of 7.9K bits per second for TDMA, or 4.8K bits per second (in average) for CDMA. The compressed packets of the speech are then forwarded by the switch 66 to encoding circuitry within the transmit modulator 32 which attaches a specific code word to the packet in accordance with central timing provided by the base station 20. Such encoding is well-known, and need not be described in detail for an understanding of the practice of the invention. The coded word is then modulated, as by means of phase-shift keying for example, upon an IF carrier via the modulator 32. Thereupon, the output signal of the transmit modulator 32 is converted from digital format to analog format by the converter 34, translated to an RF carrier at the transmitter 48, and outputted via the duplexer 54 and the antenna 52 to the base station 20.

Reception of the voice signal in the digital communication mode proceeds in corresponding fashion wherein the signal, received from the base station 20 via the antenna 52 and the duplexer 54, is translated at the receiver 50 from the RF carrier to an IF carrier. Thereupon, the received signal is converted from analog to digital format by the converter 38 and applied to the receive demodulator 36. The receive demodulator 36 is operative to demodulate the phase modulation and to recover the compressed packet by a decoding of the code word. Thereupon, the compressed packet is forwarded via the switch 68 to the digital receiver 44 which decompresses, or expands, the packet from the sampling rate of 7.95K bits per second to obtain the original sampling rate of 104K bits per second (or 64K bits per second). The signal format at the output of the digital receiver 44 is the same format as is present at the input terminal of the digital transmitter 42. The output signal of the digital receiver 44 is applied via the switch 60 to the converter 72 to regain the analog signal format for driving the speaker 14. Control of the switches 58, 60, 62, 64, 66, and 68 to provide interconnections of the components of the DSP 26 is accomplished by commands from the microcontroller unit 28.

The telephone 10 further comprises a memory 76 for storage of speech received from the microphone 12 or the receiver 50, and for outputting speech to the speaker 14 or to the transmitter 48. In the preferred embodiment of the invention, the speech is compressed prior to being stored in the memory 76. If desired, the memory 76 may be divided into a transmit section 78 and a receive section 80. Thereby, signals stored for subsequent transmission via the transmitter 48 may be stored in the transmit section 78, and signals inputted from the receiver 50 may be stored in the receive section 80. An address unit 82 which includes control circuitry for the memory 76 applies address signals to the memory 76, under command of the microcontroller unit 28, for storing the various speech messages at desired locations within the memory 76, and for reading out stored speech and any other form of message or data which may be stored within the memory 76.

The DSP 26 further comprises two switches 84 and 86 connected respectively to input and output ports of the memory 78. The switch 84 enables the selective inputting of data to the memory 78 from either the transmit or receive channels of the telephone 10, while the switch 86 enables outputting of data from the memory 78 to either the transmit or receive channels of the telephone 10. Direction of the memory 78 to store or to output speech and/or other data comes from commands entered via pushbuttons on the control panel 30, or by commands from a distant telephone communicating via the base station 20. In the case of communication of directions to the memory 78 via the base station 20, the commands are received as codes which are decoded by a decoder 88. The decoder 88 is responsive to coded signals which are received by the receiver 50 and appear in demodulated form at the receive demodulator 36. The decoder 88 outputs the decoded commands to the microcontroller unit 28.

In the operation of the telephone 10, whether the particular mode of operation involve the memory 76 or not, the various circuits within the telephone 10 may be powered by a battery 90. A sensor 92 of the voltage outputted by the battery 90 monitors the battery voltage and the state of charge of the battery, the battery voltage being related to the state of charge. The sensor 92 outputs the battery voltage to the microcontroller unit 28 whereby the microcontroller unit 28 is able to assess the useful lifetime of the battery 90 remaining until the next charge. In accordance with a feature of the invention, the remaining useful lifetime of the battery 90 can be extended by reducing the sampling rate of the codec 24 and the corresponding sampling rate of the compression circuitry of the digital transmitter 42. Due to the reduced sampling rate, the fidelity of the speech is reduced. This mode of operation is introduced by the microcontroller unit 28 under command of a person using the telephone 10, the person entering the command by pushbuttons on the control panel 30.

In the operation of the memory 76, a watchdog circuit 94 connects between the memory 76 and the microcontroller 28 for monitoring the utilization of storage space within the memory 76, and for reporting to the microcontroller unit 28 the availability of the storage space within the memory 76. In this way, the microcontroller unit 28 can present a message on the control panel 30 alerting the user of the telephone 10 to the fact that the user may need to cut short his message in order to conserve the available memory space. Also, in accordance with a feature of the invention, the watchdog circuit 94 may be employed for signaling the microcontroller 28 to reduce the compression rate of the vocoder 74 and the compression circuitry of the digital transmitter 42 to reduce the number of samples per spoken word which are to be stored in the available space of the memory 76. This feature of the invention extends the length of a message, inputted via the microphone 12, which can be stored in the memory 76.

The switch 58 is shown as having a mechanical construction including a slider which enables connection of the output terminal of the converter 70 to either the analog transmitter 40, the digital transmitter 42, or to both the analog transmitter 40 and the digital transmitter 42. The switch 84 is of similar construction, and enables connection of the input port of the memory 76 to either the digital transmitter 42 (via the switch 66), or to an output terminal of the receive demodulator 36, or to both the digital transmitter 42 and to the receive demodulator 36. The switch 66 has three output terminals wherein a first of the output terminals enables connection of the digital transmitter 42 to the transmit modulator 32, a second of the output terminals enables connection of the digital transmitter 42 to a line 96 interconnecting the digital transmitter 42 with the switches 86, 84, and 68, and a third output terminal which may include a load resistor (not shown) wherein the switch 66 may be parked when the digital transmitter 42 is not in use. As is the case with the switches 58 and 84, the input terminal of the switch 66 is provided with a slider to enable connection, if desired, with both the line 96 and the transmit modulator 32. The switch 68 also has three input terminals of which one terminal serves as a position for parking the switch 68 when the digital receiver 44 is not in use. Also, in the case of the switch 86, there are three output terminals, one of which serves as a position for parking the switch 86 when no output signal is required from the memory 76.

For operation of the telephone 10 in the manner of a voice pad, in accordance with a feature of the invention, a message is stored in the memory 76 for recall at a later time. This feature may be implemented in different embodiments. In a first of the embodiments, speech from the microphone 12 is to be coupled to the memory 76 for storage therein, and the stored speech or message may be played back at a later date to be heard via the speaker 14. In order to provide efficient utilization of the space of the memory 76, the speech is to be compressed by the compression circuitry of the digital transmitter 42 prior to storage within the memory 76. Accordingly, upon entering a voice-pad command into the control panel 30 for the microcontroller unit 28, the switches 58, 64, 66, and 84 are operated to provide for a circuit path by which the output terminal of the converter 70 is coupled via the switches 58 and 64 to an input terminal of the digital transmitter 42, and wherein an output terminal of the digital transmitter 42 is coupled via the switches 66 and 84 to the memory 76.

In operation, the converter 70 converts the speech, or voice signals, to digital words which are compressed by the compression circuitry of the digital transmitter 42 to the format of compressed speech, the compressed speech then being inputted into storage space of the memory 76 at addresses commanded by the address unit 82. At the later date, when it is desired to recall the stored message, the stored message may be outputted to the speaker 14 by operation of the switches 86, 68, and 60 to provide an electrical circuit path from the output port of the memory 76 to the input terminal of the digital receiver 44, and from the output terminal of the digital receiver 44 to the converter 72 for outputting the speech at the speaker 14. The expansion circuitry of the digital receiver 44 acts to expand the compressed speech to restore the speech to its original digital format, whereupon the converter 72 converts the digital format to the analog format to output the analog speech from the speaker 14.

Alternatively, if desired, the stored message may be recalled via the transmit channel of the telephone 10 by connecting the switch 86 to provide a circuit path from the output port of the memory 76 to the digital input terminal of the transmit modulator 32. Thereby, a person at a distant telephone can receive the outputted message via the base station 20. If desired, the switches 58, 64, and 66 may be operated to connect the microphone 12 and the converter 70 via the digital transmitter 42 to the digital input terminal of the transmit modulator 32. This enables the outgoing voice of a person speaking into the microphone 12 to be communicated to the distant telephone via the base station 20 along with the message being outputted by the memory 76. By way of example, this mode of operation enables a previously stored memorandum to be included within a telephone conversation.

It is also possible to accomplish the voice-pad function by recording an outgoing message spoken into the microphone 12 during a telephone conversation, by operating the switch 66 to connect the digital transmitter 42 to both the transmit modulator 32 and, via the switch 84, to the memory 76. Thereby, the compressed digital outgoing speech is applied to both the transmit modulator 32 for transmission to the base station 20, and to the memory 76, to be stored for later recall. The recall can be done at a later time during the same conversation, as has been explained hereinabove, or at a time subsequent to the conversation.

In the operation of the voice-pad function, a spoken message by a person at the distant telephone, communicated via the base station 20 to the telephone 10, can be entered into the memory 76 to be stored for later recall. For digital mode communication, the switch 84 is operated to connect the input port of the memory 76 to the output terminal of the receive demodulator 36. Thereby, as the compressed speech is outputted from the receive demodulator 36 to be expanded in the digital receiver 44 for subsequent output at the speaker 14, the compressed speech from the receive demodulator 36 is also applied to the memory 76 to be stored therein. This recording function of the memory 76 is implemented by operation of pushbuttons on the control panel 30 to direct the microcontroller unit 28 to activate the voice-pad function by storing the incoming compressed speech within the memory 76.

The foregoing description of the voice-pad feature has been described in terms of a digitally operated telephone system. However, in the event that the telephonic communication is being carried on in the analog mode, the telephone 10 is still capable of accomplishing the voice-pad feature. Thus, to accomplish a recording of the outgoing voice from the microphone 12 during communication in the analog mode with a distant telephone via the base station 20, the switch 58 is positioned to couple the converter 70 to both the analog transmitter 40 and, via the switch 64, to the digital transmitter 42. The voice signals communicated via the analog transmitter 40 proceed through the transmit channel to the RF unit 16 in the analog mode of communication. Concurrently, the speech outputted by the converter 70 is compressed by the compression circuits of the digital transmitter 42, and applied via the switches 66 and 84 to the memory 76 to be stored in compressed format therein.

Storage of speech signals communicated via the analog mode through the receive demodulator 36 can be accomplished in the following manner. Speech in the analog format is outputted by the analog receiver 46, and is applied via the switches 62 and 64 to the digital transmitter 42 which provides the speech compression. Thereafter, the compressed speech from the digital transmitter 42 is applied via the switches 66 and 84 to the memory 76 to be stored in the compressed format within the memory 76. The playback of the recorded speech must be accomplished by a digital expansion procedure and, accordingly, the speech outputted by the memory 76 is coupled via the switches 86 and 68 to the expansion circuitry of the digital receiver 44. Thereupon, the compressed speech is expanded and applied via the switch 60 to the converter 72 to be outputted by the speaker 14.

The routing of the analog-format voice signal via the digital transmitter 42 and, after readout from the memory 76, the further routing through the digital receiver 44 restore the voice signal to its original analog format. However, a digital signal quality is appended to the signal. If desired, the received analog signal can be routed through both the digital transmitter 42 and the digital receiver 44 without storage in the memory 76, such routing being accomplished simply to impart the digital sound quality to the received signal whereby the digital sound quality is received both in communication via the digital format and communication via the analog format. This may be advantageous in certain communication situations wherein there is a hand-off between one base station in the digital mode and a second base station in the analog mode, as has been described in further detail in pending U.S. application of Heidari, Ser. No. 08/381,314 filed on Jan. 31, 1995.

Furthermore, in accordance with the invention, the prompt feature is accomplished by storing an instructional message within the memory 76. If desired, several instructional messages may be stored within the memory 76, individual ones of the messages then being accessed by pushbuttons on the control panel 30 to direct the microcontroller unit 28 to read out a desired message from the memory 76. In the practice of the prompt function, the initial storage of the message is accomplished in the manner previously described wherein the message is spoken into the microphone 12, converted to digital format by the converter 70, and then applied via the switches 58 and 64 to the digital transmitter 42. The compression circuitry of the digital transmitter 42 compresses the speech whereupon, via the switches 66 and 84, the compressed speech is applied to the memory 76 for storage therein.

Readout is accomplished in a manner analogous to the readout of an outgoing message of an answer machine employed in voice mail situations. The presence of an incoming signal, communicated via the base station 20, is determined by the decoder 88. The decoder 88 then signals the microcontroller unit 28 of the presence of the incoming signal. The person utilizing the telephone 10 may then lift the receiver and talk via the microphone 12. Alternatively, if the person utilizing the telephone 10 is in a situation wherein speaking is not advisable, such as in a meeting, then the receiver (not shown) remains on hook and the microcontroller unit 28 directs the memory 76, via the address unit 82, to output the desired stored message, or prompt. The outputted message, or prompt, is communicated via the switch 86 to the transmit modulator 32, thereby providing an outgoing prompt message to the distant telephone advising a person at the distant telephone with a specific instruction. By way of example, the specific instruction, or prompt, may advise the person at a distant telephone to wait a moment while the person at the telephone 10 proceeds to another location wherein it is appropriate to lift the receiver and begin speaking into the microphone 12. The prompt feature of the invention avoids the situation wherein a telephone caller may hang up prematurely before the intended called person has a chance to pick up the receiver and begin conversing.

The invention also provides for the feature of voice mail which is implemented by the telephone 10 in a manner similar to that of the prompt. In this case, the outgoing message of the prompt advises the calling party to leave a message after a tone. The tone may be prerecorded within the memory 76 and outputted under command of the microcontroller unit 28. Thereupon, in the case of the digital mode of communication, the switch 84 connects the input port of the memory 76 to the output digital-mode port of the receive demodulator 36 to store the incoming message from the distant telephone.

In the event that the telephone 10 is operating in the analog mode of communication with the distant telephone for the voice mail function, the analog mode of signal is applied via the output analog terminal of the receive demodulator 36 to the analog receiver 46. Thereupon, by operation of the switches 62 and 64, the analog-mode signal outputted by the receiver 46 is connected to the digital transmitter 42 which provides for the digital compression of the incoming message. The compressed incoming message is then coupled via the switches 66 and 84 to the memory 76 to be recorded therein. Operation of the switches 62, 64, 66, and 84 is accomplished under control of the microcontroller unit 28 as has been noted hereinabove. Playback of the recorded message from the memory 76 is accomplished in any one of the modes described hereinabove. For example, the playback may be accomplished by directing the outputted signal from the memory 76 via the switches 86 and 68 to the digital receiver 44 for expansion of the compressed signal, whereupon the expanded signal is coupled via the switch 60 to the converter 72 for outputting at the speakers 14. Alternatively, the message outputted by the memory 76 may be connected via the switch 86 to the digital-mode input terminal of the transmit modulator 32 for transmission to a distant telephone in a subsequent telephonic communication between the distant telephone and the telephone 10.

An aspect of the voice mail feature is the fact that, in the digital-mode of communication, the telephone number of the distant calling party is included within the transmission protocol. This is recognized by the decoder 88 and applied to the microcontroller unit 28 which provides the number to the control panel 30 for presentation on a display thereof. If desired, no message need be left by the calling party, in which case the voice mail feature is reduced to simply the function of a beeper which displays the number of the calling party. In the case of the analog-mode of communication, the prompt of the outgoing message of the voice-mail feature should include a request of the calling party to leave the telephone number as a part of the incoming message. If desired, the decoder 88 may include circuitry (not shown) for detection of the DTMF (dual tone multiple frequency) tones, and the voice prompt of the outgoing message direct the calling party to enter a desired call-back telephone number via the keypad of the calling party.

A further feature of the invention is the use of the telephone 10 to provide the function of a digital transcriber. In this mode of operation, a message is to be stored within the memory 76, and is to be outputted via the speaker 14 for transmission by a secretary, or is to be outputted to a distant telephone via communication through the base station 20 for transcription by a secretary at the location of the distant telephone. The message or dictation to be transcribed is stored in the memory 76 in the same fashion as has been described hereinabove for the storing of a prompt within the memory 76. For reading out the stored message, the readout may occur via the speaker 14 in the same manner as has been described for operation of the voice pad or the voice mail functions.

Alternatively, for transmission of the dictation to the distant telephone, communication is established with the distant telephone, after which the stored message or dictation is outputted from the memory 76 via the switch 86 to the input digital-mode terminal of the transmit modulator 32. Thereupon, the dictation proceeds over the communication link to the distant telephone via the base station 20. Initiation or termination of the playback of the message from the memory 76 is accomplished by use of the pushbuttons on the control panel 30 for directing the microcontroller unit 28 to initiate the reading-out or for terminating the reading-out of the message. Since the decoder 88 is capable of detecting the DTMF tones of a distant calling telephone, the decoder 88 may be constructed with the capacity to discern among various commands which may be implemented by the tones such as forward, reverse, and play functions, commonly associated with transcription equipment. In this way, the distant caller can control the readout function from the memory 76 to facilitate the transcription process and to increase its accuracy.

In the foregoing description, the various switches 58–68 and 84–86 have been described in terms of mechanical forms of switches. However, it is to be understood that the functions of these switches are to be performed in a preferred embodiment of the invention by electronic switching circuitry. Also, the base station 20 is understood to be a facility for controlling telephone traffic. In the case of cellular telephony, such a facility is housed in a building with antennas for communicating with the radiotelephones, or mobile telephones, within the communication cell handled by the base station. However, the principles of the invention apply also to other forms of communication systems, such as a traffic control facility carried on board a satellite, in which case the base station would be the satellite.

By virtue of the foregoing features, and their implementation with the existing equipment of the telephone 10, the invention has demonstrated the use of the existing equipment to provide numerous additional benefits with minimal additions of hardware and software to a dual-mode telephone.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A radiotelephone comprising:
 a radio frequency (RF) unit enabling transmission and reception of voice signals between the radiotelephone and a distant site via a base station;
 a voice input means and a transmit channel interconnecting the voice input means to the RF unit;

a voice output means and a receive channel interconnecting the voice output means to the RF unit;

a memory for storing one of said voice signals, said one voice signal being carried by either of said channels;

switching means comprising an input switch operative to direct said voice signal to said memory from at least one of said channels, said switching means further comprising an output switch operative to direct said voice signal from said memory to either one of said channels;

controller means, operative in response to a first command, for directing said switching means to effect connection of said memory to either one of said channels for storing in said memory said voice signal carried by said one channel; and wherein said controller means is operative further, in response to a second command, for directing said switching means to effect connection of said memory to one of said channels for outputting said voice signal from said memory; and the radiotelephone further comprises a speech compressor operative for compressing a distant one of said voice signals from said distant site, and said switching means is operative for routing said distant voice signal from said receive channel via said speech compressor to said memory for storage of said distant voice signal in said memory in compressed format.

2. A radiotelephone according to claim 1 wherein, in response to said first command, said memory stores said voice signal from said transmit channel and, in response to said second command, said memory outputs said voice signal to said transmit channel, wherein said first command is initiated at the radiotelephone and said second command is initiated at the distant site for attainment of a prompt function.

3. A radiotelephone according to claim 2 further comprising means for inputting said first command to said controller means, and means for extracting said second command from said receive channel and for applying said second command to said controller means.

4. A radiotelephone according to claim 1 wherein said transmit channel has a digital protocol signal portion including a compressor of voice signals, said receive channel has a digital protocol signal portion including an expander of voice signals, and said memory stores digitally compressed voice signals.

5. A radiotelephone according to claim 1 wherein, in response to said first command, said memory stores said voice signal from said receive channel and, in response to said second command, said memory outputs said voice signal to said receive channel, wherein said first command is initiated at the radiotelephone and said second command is initiated at the radiotelephone for attainment of a voice-pad function with recordation of a distant one of said voice signals from the distant site.

6. A radiotelephone comprising:

a radio frequency (RF) unit enabling transmission and reception of voice signals between the radiotelephone and a distant site via a base station;

a voice input means and a transmit channel interconnecting the voice input means to the RF unit;

a voice output means and a receive channel interconnecting the voice output means to the RF unit;

a memory for storing one of said voice signals, said one voice signal being carried by either of said channels;

switching means comprising an input switch operative to direct said voice signal to said memory from at least one of said channels, said switching means further comprising an output switch operative to direct said voice signal from said memory to at least one of said channels;

controller means, operative in response to a first command, for directing said switching means to effect connection of said memory to one of said channels for storing in said memory said voice signal carried by said one channel; and wherein said controller means is operative further, in response to a second command, for directing said switching means to effect connection of said memory to one of said channels for outputting said voice signal from said memory;

in response to said first command, said memory stores said voice signal from said receive channel and, in response to said second command, said memory outputs said voice signal to said receive channel, wherein said first command is initiated at the radiotelephone and said second command is initiated at the radiotelephone for attainment of a voice-pad function with recordation of a distant one of said voice signals from the distant site; and said receive channel is operative in an analog mode of communication, the radiotelephone further comprises a speech compressor, and said switching means is operative for routing said distant voice signal from said receive channel via said speech compressor to said memory for storage of said distant voice signal in said memory in compressed format.

7. A radiotelephone according to claim 6 wherein said speech compressor is located in said transmit channel to enable transmission of an outgoing one of said voice signals in a digital communication mode.

8. A radiotelephone according to claim 7 further comprising a speaker and a speech expander located in said receive channel to enable receipt of an incoming one of said voice signals via said digital communication mode, and wherein said switching means is operative for routing said distant voice signal from said memory via said speech expander to said speaker, said expander serving to convert said distant voice signal from a compressed format to a normal format to be heard via said speaker.

9. A radiotelephone comprising:

a radio frequency (RF) unit enabling transmission and reception of voice signals between the radiotelephone and a distant site via a base station;

a voice input means and a transmit channel interconnecting the voice input means to the RF unit;

a voice output means and a receive channel interconnecting the voice output means to the RF unit;

a memory for storing one of said voice signals, said one voice signal being carried by either of said channels;

switching means comprising an input switch operative to direct said voice signal to said memory from at least one of said channels, said switching means further comprising an output switch operative to direct said voice signal from said memory to at least one of said channels;

controller means, operative in response to a first command, for directing said switching means to effect connection of said memory to one of said channels for storing in said memory said voice signal carried by said one channel;

wherein said controller means is operative further, in response to a second command, for directing said switching means to effect connection of said memory to one of said channels for outputting said voice signal from said memory;

the radiotelephone further comprises a speech compressor for compressing a distant one of said voice signals from said distant site, and said switching means is operative for routing said distant voice signal from said receive channel via said speech compressor to said memory for storage of said distant voice signal in said memory in compressed format; and the radiotelephone is dual-mode radiotelephone having analog and digital branches in each of said channels, the radiotelephone further comprising a voice compressor located in said digital branch of said transmit channel and a voice expander located in said digital branch of said receive channel, said voice-pad function is attained by storing said voice signal in compressed format in said memory, and wherein said switching means is operative during a playback of said voice signal from said memory to route said voice signal from an output port of said memory to said expander for converting said voice signal from a compressed format to a normal format.

10. A radiotelephone comprising:

a radio frequency (RF) unit enabling transmission and reception of voice signals between the radiotelephone and a distant site via a base station;

a voice input means and a transmit channel interconnecting the voice input means to the RF unit;

a voice output means and a receive channel interconnecting the voice output means to the RF unit;

a memory for storing one of said voice signals, said one voice signal being carried by either of said channels;

switching means comprising an input switch operative to direct said voice signal to said memory from at least one of said channels, said switching means further comprising an output switch operative to direct said voice signal from said memory to at least one of said channels;

controller means, operative in response to a first command, for directing said switching means to effect connection of said memory to one of said channels for storing in said memory said voice signal carried by said one channel; and wherein said controller means is operative further, in response to a second command, for directing said switching means to effect connection of said memory to one of said channels for outputting said voice signal from said memory;

the radiotelephone is a dual-mode radiotelephone having analog and digital branches in each of said channels, the radiotelephone further comprising a voice compressor located in said digital branch of said transmit channel and a voice expander located in said digital branch of said receive channel;

in response to said first command said memory stores said voice signal from said transmit channel and, in response to said second command, said memory outputs said voice signal to said receive channel, said first command and said second command being initiated at the radiotelephone for attainment of a voice-pad function with recordation of an outgoing one of said voice signals;

said switching means is operative during a recordation of said outgoing voice signal to route said outgoing voice signal via said compressor to said memory to attain said voice-pad function by storage of said outgoing voice signal in compressed format in said memory; and said switching means is operative during a playback of said voice signal from said memory to rout said outgoing voice signal from said memory to said expander for converting said voice signal from a compressed format to a normal format.

11. A radiotelephone according to claim 10 wherein said switching means is operative to apply said outgoing voice signal to both said analog and said digital branches of said transmit channel to enable communication between the radiotelephone and the distant site via an analog mode of communication concurrently with operation of said voice-pad function with storage of said outgoing voice signal in the compressed format in said memory.

12. A radiotelephone comprising:

a radio frequency (RF) unit enabling transmission and reception of voice signals between the radiotelephone and a distant site via a base station;

a voice input means and a transmit channel interconnecting the voice input means to the RF unit;

a voice output means and a receive channel interconnecting the voice output means to the RF unit;

a memory for storing one of said voice signals, said one voice signal being carried by either of said channels;

switching means comprising an input switch operative to direct said voice signal to said memory from at least one of said channels, said switching means further comprising an output switch operative to direct said voice signal from said memory to at least one of said channels;

controller means, operative in response to a first command, for directing said switching means to effect connection of said memory to one of said channels for storing in said memory said voice signal carried by said one channel;

wherein said controller means is operative further, in response to a second command, for directing said switching means to effect connection of said memory to one of said channels for outputting said voice signal from said memory;

the radiotelephone is a dual-mode radiotelephone having analog and digital branches in each of said channels, the radiotelephone further comprising a voice compressor located in said digital branch of said transmit channel and a voice expander located in said digital branch of said receive channel, a storage of said voice signal in said memory being attained by storing said voice signal in compressed format in said memory, and wherein said switching means is operative during a playback of said voice signal from said memory to rout said voice signal from an output port of said memory to said expander for converting said voice signal from a compressed format to a normal format; and wherein the radiotelephone further comprises a battery providing battery-powered operation of the radiotelephone, and means for determining a status of stored energy within said battery, said controller means being operative to extend a communication function of the radiotelephone during a low-energy state of said battery by reducing a sampling rate of said compressor.

13. A radiotelephone comprising:

a radio frequency (RF) unit enabling transmission and reception of voice signals between the radiotelephone and a distant site via a base station;

a voice input means and a transmit channel interconnecting the voice input means to the RF unit;

a voice output means and a receive channel interconnecting the voice output means to the RF unit;

a memory for storing one of said voice signals, said one voice signal being carried by either of said channels;

switching means comprising an input switch operative to direct said voice signal to said memory from at least one of said channels, said switching means further comprising an output switch operative to direct said voice signal from said memory to at least one of said channels;

controller means, operative in response to a first command, for directing said switching means to effect connection of said memory to one of said channels for storing in said memory said voice signal carried by said one channel;

sampling means for converting an outgoing one of said voice signals from analog format to digital format; and wherein said controller means is operative further, in response to a second command, for directing said switching means to effect connection of said memory to one of said channels for outputting said voice signal from said memory; and wherein the radiotelephone further comprises a battery providing battery-powered operation of the radiotelephone, and means for determining a status of stored energy within said battery, said controller means being operative to extend a communication function of the radiotelephone during a low-energy state of said battery by reducing a sampling rate of said sampling means.

14. A radiotelephone comprising:

a radio frequency (RF) unit enabling transmission and reception of voice signals between the radiotelephone and a distant site via a base station;

a voice input means and a transmit channel interconnecting the voice input means to the RF unit;

a voice output means and a receive channel interconnecting the voice output means to the RF unit;

a memory for storing one of said voice signals, said one voice signal being carried by either of said channels;

switching means comprising an input switch operative to direct said voice signal to said memory from at least one of said channels, said switching means further comprising an output switch operative to direct said voice signal from said memory to at least one of said channels;

controller means, operative in response to a first command, for directing said switching means to effect connection of said memory to one of said channels for storing in said memory said voice signal carried by said one channel;

sampling means for converting an outgoing one of said voice signals from analog format to digital format; and wherein said controller means is operative further, in response to a second command, for directing said switching means to effect connection of said memory to one of said channels for outputting said voice signal from said memory; and the radiotelephone further comprises watchdog means for monitoring available storage space in said memory, said controller means being operative to extend a communication function of the radiotelephone during a state of reduced availability of storage space in said memory by reducing a sampling rate of said sampling means.

15. A radiotelephone according to claim 1 wherein, in response to said first command, said memory stores said voice signal from said transmit channel and, in response to said second command, said memory outputs said voice signal to said transmit channel, wherein said first command is initiated at the radiotelephone and said second command is initiated at the radiotelephone for attainment of a transcribe function with recordation of an outgoing one of said voice signals for transcription to the distant site.

16. A radiotelephone according to claim 1 wherein, in response to said first command, said memory stores said voice signal from said receive channel and, in response to said second command, said memory outputs said voice signal to said receive channel, wherein said first command is initiated at the distant site and said second command is initiated at the radiotelephone for attainment of a voice-mail function with recordation of a distant one of said voice signals from the distant site.

17. A radiotelephone comprising:

a radio frequency (RF) unit enabling transmission and reception of voice signals between the radiotelephone and a distant site via a base station;

a voice input means and a transmit channel interconnecting the voice input means to the RF unit;

a voice output means and a receive channel interconnecting the voice output means to the RF unit;

sampling means for converting an outgoing one of said voice signals from analog format to digital format for communication via said transmit channel;

a battery providing battery-powered operation of the radiotelephone;

status means for determining a status of stored energy within said battery; and controller means operative to extend a communication function of the radiotelephone during a low-energy state of said battery by reducing a sampling rate of said sampling means.

18. A radiotelephone comprising:

a radio frequency (RF) unit enabling transmission and reception of voice signals between the radiotelephone and a distant site via a base station;

a voice input means and a transmit channel interconnecting the voice output means to the RF unit;

a voice output means and a receive channel interconnecting the voice output means to the RF unit;

sampling means for converting an outgoing one of said voice signals from analog format to digital format for communication via said transmit channel;

means for determining a status of stored energy within a battery supplying electric power to the radiotelephone; and controller means operative to alter a sampling rate of said sampling means during a low-energy state of the battery.

19. A radiotelephone comprising:

a radio frequency (RF) unit enabling transmission and reception of voice signals between the radiotelephone and distant site via a base station;

a voice input means and a transmit channel interconnecting the voice input means to the RF unit;

a voice output means and a receive channel interconnecting the voice output means to the RF unit;

a memory for storing one of said voice signals, said one voice signal being carried by either of said channels;

switching means comprising an input switch operative to direct said voice signal to said memory from at least one of said channels, said switching means further comprising an output switch operative to direct said voice signal from said memory to at least one of said channels, the radiotelephone being a dual-mode radiotelephone having analog and digital branches in each of said channels; and a voice compressor located in said digital branch of said transmit channel and a voice expander located in said digital branch of said receive channel; and wherein said one voice signal is coupled via said compressor to said memory for compressing said one voice signal prior to a storing of said voice signal in said memory, and wherein said expander is coupled to said memory for expanding said one voice signal upon an outputting of said voice signal from said memory, thereby to recover said voice signal from a compressed format subsequent to a storage of said voice signal in said memory.

* * * * *

UNITED STATES PATENT AND TRADEMARK OFFICE
CERTIFICATE OF CORRECTION

PATENT NO. : 5,790,957
DATED : Aug. 4, 1998
INVENTOR(S) : Heidari

It is certified that error appears in the above-identified patent and that said Letters Patent is hereby corrected as shown below:

IN THE CLAIMS:

In column 15, line 11, after "is" add --a--.

In column 15, line 57, after "command" add a comma.

In column 16, line 5, "rout" should be --route--.

In column 16, line 52, "rout" should be --route--.

Signed and Sealed this

Nineteenth Day of January, 1999

Attest:

Attesting Officer

*Acting Commissioner of Patents and Trademarks*